United States Patent
Camp et al.

(10) Patent No.: US 9,569,306 B1
(45) Date of Patent: Feb. 14, 2017

(54) RECOVERY OF MULTI-PAGE FAILURES IN NON-VOLATILE MEMORY SYSTEM

(71) Applicant: INTERNATIONAL BUSINESS MACHINES CORPORATION, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Thomas Parnell, Zurich (CH); Roman A. Pletka, Zurich (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/975,237

(22) Filed: Dec. 18, 2015

(51) Int. Cl.
*G06F 11/00* (2006.01)
*G06F 11/10* (2006.01)
(Continued)

(52) U.S. Cl.
CPC ......... *G06F 11/1068* (2013.01); *G06F 3/064* (2013.01); *G06F 3/0619* (2013.01); *G06F 3/0688* (2013.01); *G06F 12/10* (2013.01); *G06F 2212/1032* (2013.01); *G06F 2212/202* (2013.01); *G06F 2212/262* (2013.01); *G06F 2212/65* (2013.01)

(58) Field of Classification Search
CPC .............. G06F 11/1068; G06F 11/1072; G06F 11/1076; G06F 3/0619; G06F 3/0688
See application file for complete search history.

(56) References Cited

U.S. PATENT DOCUMENTS 7,856,528 B1 * 12/2010 Frost ................... G06F 11/1044
711/114
8,024,545 B2 9/2011 Kim et al.
(Continued)

OTHER PUBLICATIONS

Disclosed Anonymously (Dec. 2013). Method and System for Utilizing Golden Pages in Flash Memory to Provide Error Free Read Capability During Flash Testing and Evaluation. IPCOM000233245D.
(Continued)

*Primary Examiner* — Philip Guyton
(74) *Attorney, Agent, or Firm* — Brian F. Russell; Randall J. Bluestone

(57) ABSTRACT

A data storage system includes a controller and a non-volatile memory array having a plurality of blocks each including a plurality of physical pages. The controller maintains a logical-to-physical translation (LPT) data structure that maps logical addresses to physical addresses and implements a first data protection scheme that stripes write data over the plurality of physical blocks. In response to a read request requesting data from a target page stripe, the controller detecting errors in multiple physical pages of the target page stripe. In responsive to detecting errors in multiple physical pages of the target page stripe, the controller scans the LPT data structure to identify a set of logical addresses mapped to the target page stripe and triggers recovery of the target page stripe by a higher level controller that implements a second data protection scheme, wherein triggering recovery includes transmitting the set of logical addresses to the higher level controller.

25 Claims, 11 Drawing Sheets

(51) Int. Cl.
*G06F 3/06* (2006.01)
*G06F 12/10* (2016.01)

(56) References Cited

U.S. PATENT DOCUMENTS

| | | | |
|---|---|---|---|
| 8,402,217 B2 * | 3/2013 | Burd | G06F 11/1028 365/185.33 |
| 8,464,021 B2 | 6/2013 | Allen et al. | |
| 2009/0172335 A1 * | 7/2009 | Kulkarni | G06F 3/061 711/170 |
| 2010/0017650 A1 * | 1/2010 | Chin | G06F 13/28 714/6.12 |
| 2013/0042053 A1 * | 2/2013 | Huang | G06F 11/106 711/103 |
| 2014/0195725 A1 | 7/2014 | Bennett | |
| 2015/0058700 A1 * | 2/2015 | Yang | G06F 11/108 714/773 |
| 2015/0169237 A1 | 6/2015 | Ioannou et al. | |
| 2015/0178191 A1 | 6/2015 | Camp et al. | |

OTHER PUBLICATIONS

Disclosed Anonymously (Feb. 2013). Detecting Potentially Unusable Blocks During the Restoration of Backed-up Data Saved onto Flash Memory. IPCOM000225586D.

* cited by examiner

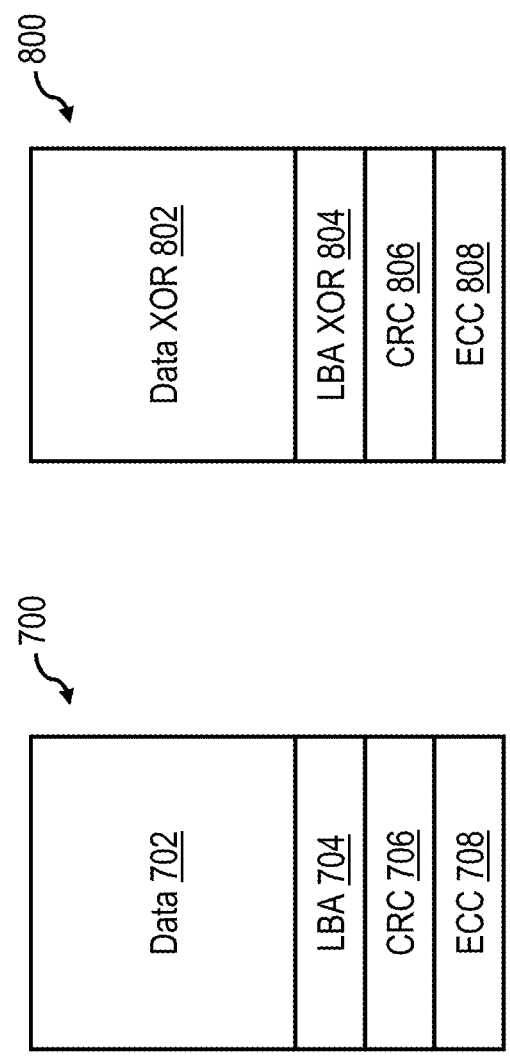

| LPT table 900 | |
|---|---|
| LBA 1102 | PBA 1104 |
| ... | ... |
| LBA(LpageB) | Lane 0, Block 10, Offset M.2 |
| ... | ... |
| LBA(LpageE) | Lane 1, Block 5, Offset M.2 |
| LBA(LpageA) | Lane 0, Block 10, Offset M.1 |
| ... | ... |
| LBA(LpageZ) | Lane N-1, Block 408, Offset M.3 |
| ... | ... |
| LBA(LpageY) | Lane N-1, Block 408, Offset M.2 |
| LBA(LpageD) | Lane 0, Block 10, Offset M.4 |
| LBA(LpageG) | Lane 1, Block 5, Offset M.4 |
| LBA(LpageH) | Lane 2, Block 201, Offset M.2 |
| ... | ... |
| LBA(LpageB) | Lane 0, Block 10, Offset M.2 |
| LBA(LpageC) | Lane 0, Block 10, Offset M.3 |
| LBA(LpageX) | Lane N-1, Block 408, Offset M.1 |
| ... | ... |
| LBA(LpageI) | Lane 2, Block 201, Offset M.3 |
| LBA(LpageF) | Lane 1, Block 5, Offset M.3 |
| ... | ... |

Fig. 11

RECOVERY OF MULTI-PAGE FAILURES IN NON-VOLATILE MEMORY SYSTEM

BACKGROUND OF THE INVENTION

This disclosure relates to data processing and storage, and more specifically, to management of a non-volatile memory system, such as a flash memory system, to support data recovery in the event of multi-page failures.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

Enterprise-class data storage systems employing all flash storage media often organize data within a flash card or solid state disk (SSD) into page stripes in which physical pages of flash memory from different channels/lanes are grouped together to add data redundancy and/or optimize parallel processing of write requests. For example, a page stripe may be formed across a set of blocks of memory from physical pages having common page indices. The integrity of the data forming the page stripe may be improved by appending a parity page to the page stripe, thus implementing a parity scheme similar to RAID 5/6.

In at least some cases, a flash card is faulted when a multi-page failure occurs in the same page stripe because the selected RAID parity scheme cannot correct such an error. For example, RAID 5 can correct single page failures, but cannot correct errors in two or more pages of the same page stripe, while RAID 6 can correct double page failures, but cannot correct errors in three or more pages of the same page stripe. A typical response to the flash card being faulted is to reconstruct the entire contents of the flash card. Reconstructing the flash card not only limits performance of the data storage system while the contents of flash card are being recovered, but also exposes the flash array to the additional fatal risk of encountering another flash card failure during the reconstruction process, which can result in unrecoverable data loss.

BRIEF SUMMARY

In at least one embodiment, an improved technique for recovering from a multi-page error in a data storage system is provided.

In one embodiment, a data storage system includes a controller and a non-volatile memory array having a plurality of blocks each including a plurality of physical pages. According to a method, the controller maintains a logical-to-physical translation (LPT) data structure that maps logical addresses to physical addresses and implements a first data protection scheme that stripes write data over the plurality of physical blocks. In response to a read request requesting data from a target page stripe, the controller detects errors in multiple physical pages of the target page stripe. In responsive to detecting errors in multiple physical pages of the target page stripe that cannot be corrected by the first data protection scheme, the controller scans the LPT data structure to identify a set of logical addresses mapped to the target page stripe and triggers recovery of the target page stripe by a higher level controller that implements a second data protection scheme, where triggering the recovery includes transmitting the set of logical addresses to the higher level controller. An advantage of this method is that recovery performance is significantly improved over prior art solutions that require rebuilding the entire flash card in which the read failure occurred.

The disclosed technique can also be realized as a data storage system comprising a controller. The controller is configured to be coupled to a non-volatile memory array including a plurality of blocks each including multiple physical pages and to a memory that includes a logical-to-physical translation (LPT) data structure that maps logical addresses to physical addresses in the non-volatile memory array. The controller is configured to implement a first data protection scheme that stripes write data over the plurality of physical blocks to form a plurality of page stripes. The controller is also configured, responsive to a read request requesting data from a target page stripe among the plurality of page stripes, to detect errors in multiple physical pages of the target page stripe and, responsive to detecting errors in multiple physical pages of the target page stripe that cannot be corrected by the first data protection scheme, to scan the LPT data structure to identify a set of logical addresses mapped to the target page stripe and to trigger recovery of the target page stripe by a higher level controller that implements a second data protection scheme, where triggering the recovery includes the controller transmitting the set of logical addresses to the higher level controller. An advantage of this data storage system is that recovery performance is significantly improved over prior art solutions that require rebuilding the entire flash card in which the read failure occurred.

The disclosed technique can also be realized as a computer program product comprising a computer readable storage medium having program instructions embodied therewith, where the program instructions executable by a controller for a non-volatile memory array including a plurality of blocks each including a plurality of physical pages. The program instructions cause the controller to perform maintaining a logical-to-physical translation (LPT) data structure that maps logical addresses to physical addresses in the non-volatile memory array and implementing a first data protection scheme that stripes write data over the plurality of physical blocks to form a plurality of page stripes. The program instructions further cause the controller, in response to a read request requesting data from a target page stripe among the plurality of page stripes, to detect errors in multiple physical pages of the target page stripe, and responsive to detecting errors in multiple physical pages of the target page stripe that cannot be corrected by the first data protection scheme, to scan the LPT data structure to identify a set of logical addresses mapped to the target page stripe and to trigger recovery of the target page stripe by a higher level controller that implements a second data protection scheme, wherein triggering recovery includes transmitting the set of logical addresses to the higher level controller. An advantage of this program product is that recovery performance is significantly improved over prior art solutions that require rebuilding the entire flash card in which the read failure occurred.

In at least one embodiment, the controller determines whether the higher level controller has completed reconstruction of the target page stripe, and in response to determining that the higher level controller has completed reconstruction of the target page stripe, relocates contents of a block stripe that included the target page stripe and multiple other page stripes within the non-volatile memory array. By relocating the block stripe, the likelihood of another failure in the block stripe can be reduced, and the pages that have been invalidated by the reconstruction can be reclaimed.

In at least one embodiment, the first and second data protection schemes comprise parity-based data protection schemes, which may be based on or similar to redundant array of independent disks (RAID) data protection scheme(s). Thus, well known data protection schemes can be employed to implement the disclosed technique.

In at least one embodiment, the controller refrains from transmitting the set of logical addresses to the higher level controller in response to the read request being a host read request. In this case, the preparatory work (and hence latency) associated with reconstruction of the target page stripe can be reduced.

BRIEF DESCRIPTION OF THE SEVERAL VIEWS OF THE DRAWINGS

FIG. 7 illustrates an exemplary codeword stored in each data page in accordance with the present disclosure;
FIG. 8 depicts an exemplary codeword stored in each data protection page in accordance with the present disclosure;
FIG. 11 illustrates an example of how the LPT table of FIG. 9 maps the logical block addresses (LBAs) of the logical pages stored within a page stripe to physical block addresses (PBAs) in accordance with one embodiment.

DETAILED DESCRIPTION

Figure 1A:
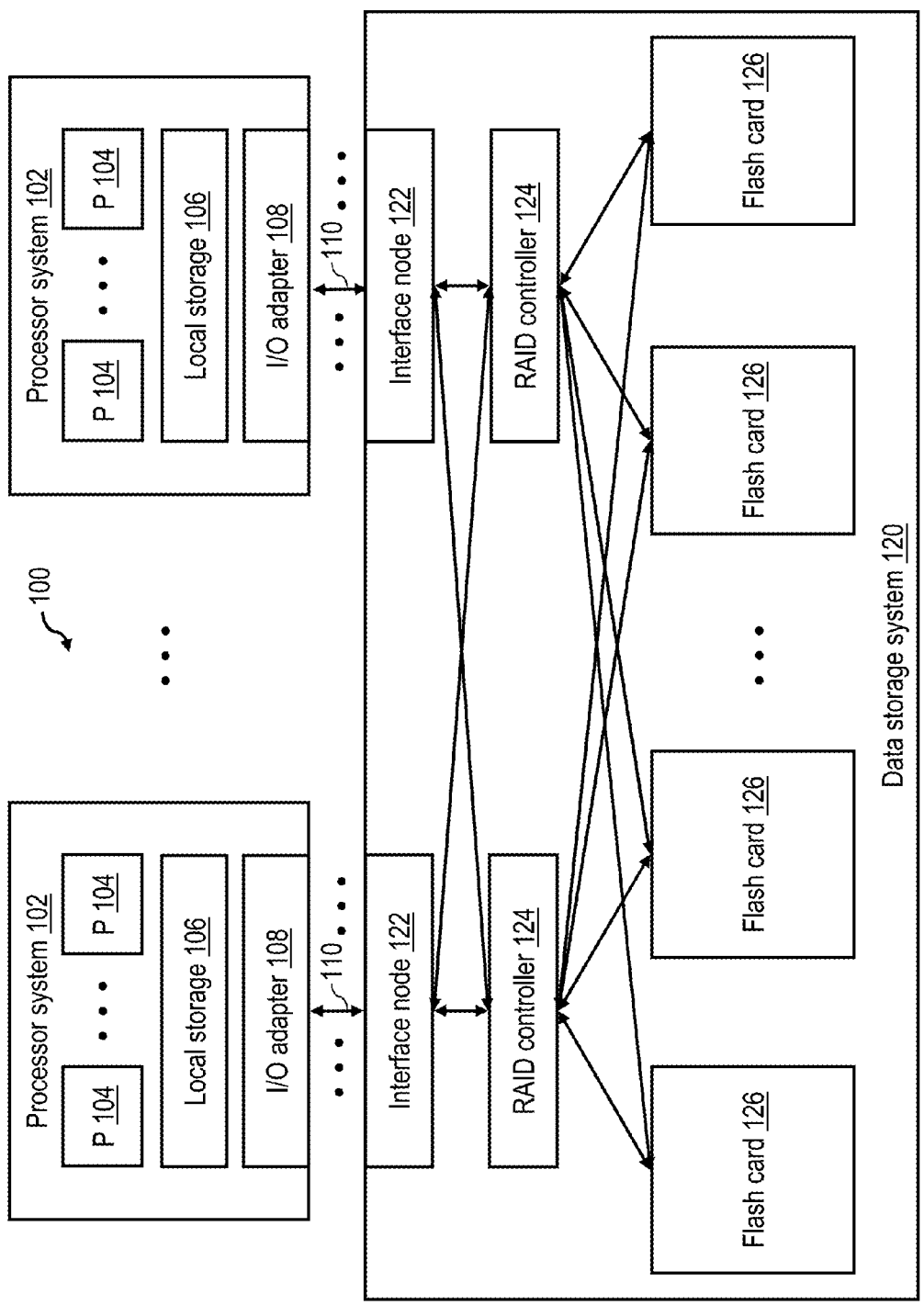
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, Power, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to input/output operations (IOP) 102 via I/O channels 110. Each interface node 122 is coupled to each of multiple Redundant Array of Independent Disks (RAID) controllers 124 in order to facilitate fault tolerance and load balancing. For example, RAID controllers 124 may implement one or more levels of RAID, including nested RAID (e.g., RAID 50 or RAID 60), across flash cards 126. Each of RAID controllers 124 is in turn coupled (e.g., by a PCIe bus) to each of multiple flash cards 126 including, in this example, NAND flash storage media. In other embodiments, other or additional lossy storage media can be employed.

Figure 1B:
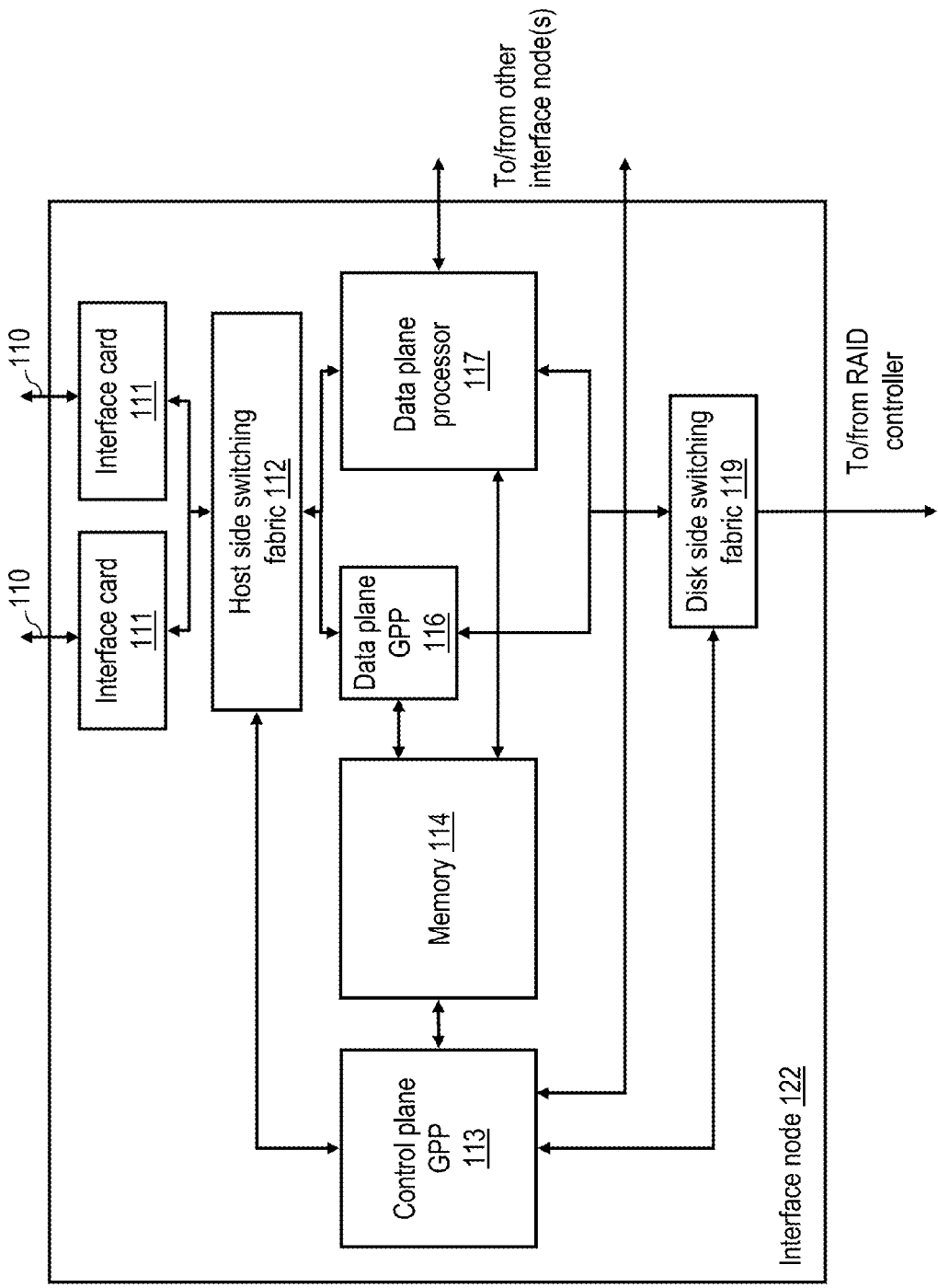
FIG. 1B is a more detailed block diagram of an exemplary interface node of the data storage system of FIG. 1A.

FIG. 1B depicts a more detailed block diagram of an interface node 122 of data storage system 120 of FIG. 1A. Interface node 122 includes one or more interface cards 111 that serve as an interface to processor systems 102 through I/O channels 110 and connect to host side switching fabric 112. Host side switching fabric 112 acts as a switch and handles all data transfers between interface cards 111 and the processing units in interface node 122, namely, control plane general purpose processor (GPP) 113, data plane GPP 116, and data plane processor 117. In a typical implementation, host side switching fabric 112 can be implemented with a PCIe switch, but other switch technologies may be used as well. Data plane processor 117 is a special purpose processor that can be implemented, for example, by an Application Specific Integrated Circuit (ASIC) or Field Programmable Gate Array (FPGA). Control plane GPP 113, data plane GPP 116, and data plane processor 117 are all connected to memory 114 which may be implemented as a shared memory between these components, separate memories, or a combination thereof.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to flash cards 126 either indirectly through the control of data plane processor 117 or directly through disk side switching fabric 119. Control plane GPP 113 executes system management functions, as well as higher level services such as data recovery, snapshots, thin provisioning, and deduplication. Data plane GPP 116 executes protocol specific functions. Control plane GPP 113, data plane GPP 116, and data plane processor 117 are connected to a RAID controller 124 through disk side switching fabric 119, which can be implemented with a PCIe switch or other switch technology. FIG. 1B further illustrates control plane GPP 113 and data plane processor 117 being connected to other interface nodes 122 in data storage system 120 to support fail-over and/or to perform other data synchronization functions.

Figure 1C:
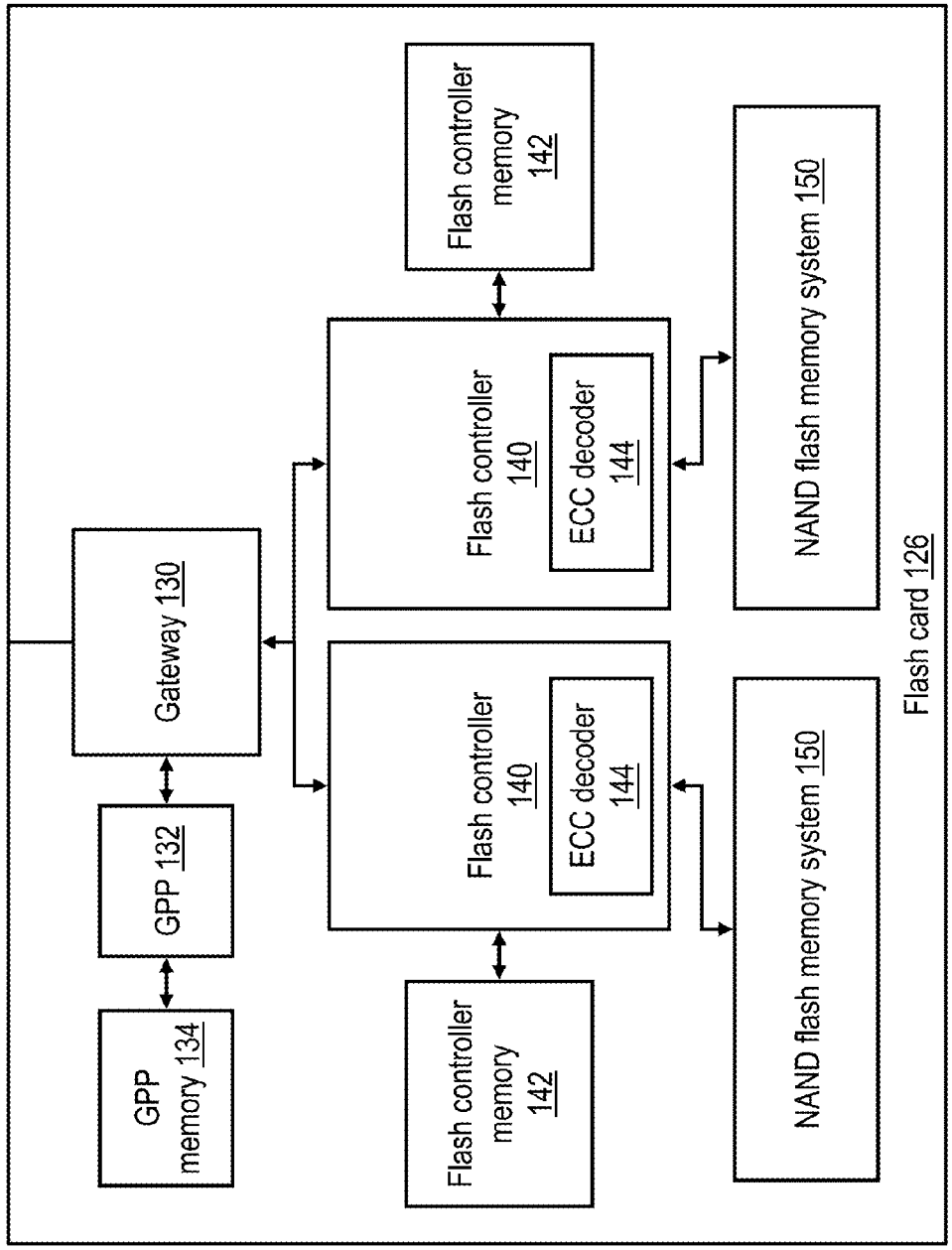
FIG. 1C is a more detailed block diagram of a flash card of the data storage system of FIG. 1A.

FIG. 1C depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an ASIC or FPGA having an associated flash controller memory 142 (e.g., DRAM). In embodiments in which flash controllers 140 are implemented with FPGAs, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1C) associated with NAND flash memory systems 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single physical page of flash memory, for example, 16 kilobytes (kB). The LBA provided by the host device corresponds to a logical page within a logical address space, the page typically having a size of 4 kilobytes. Therefore, more than one logical page may be stored in a physical flash page. The flash translation layer translates this LBA into a physical address assigned to a corresponding physical location in a NAND flash memory system 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
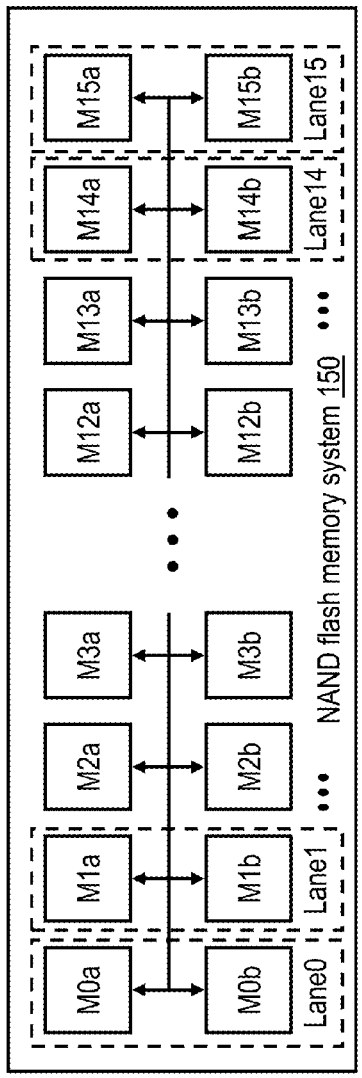
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing one or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
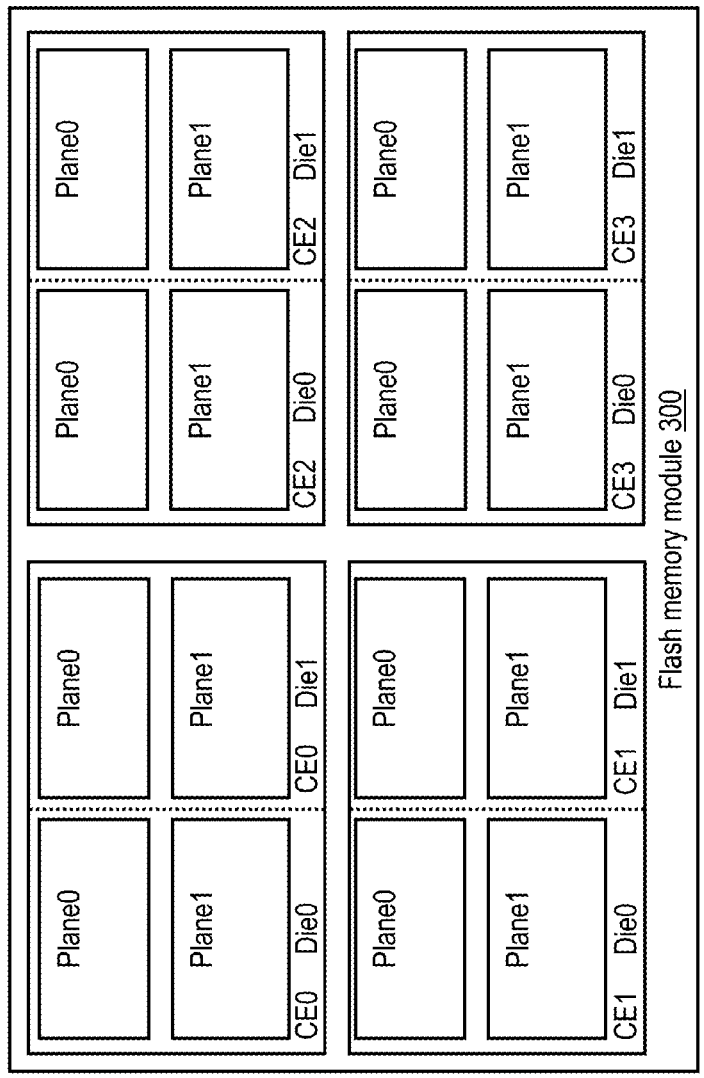

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
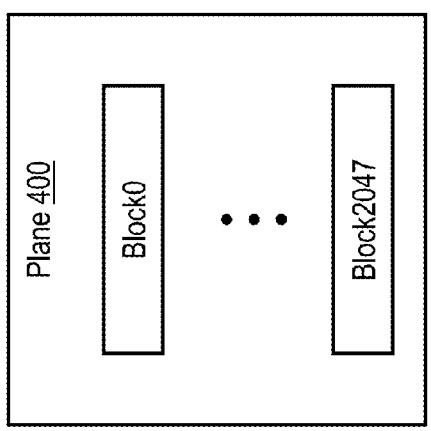
Figure 5:
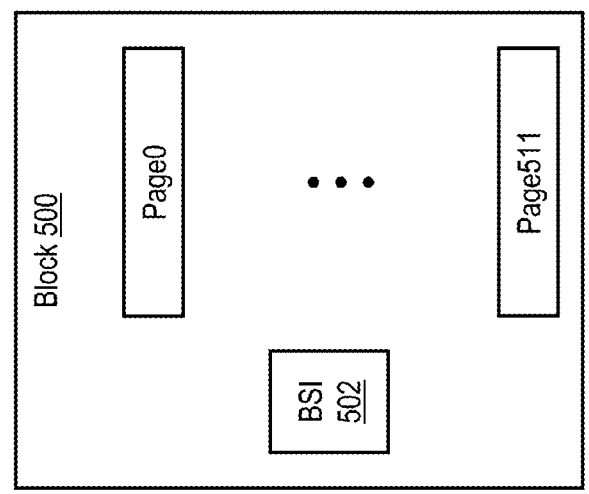

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block 500 is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented is a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer.

As further shown in FIG. 5, each block 500 preferably includes block status information (BSI) 502, which indicates the page retirement status of physical pages comprising that block 500 as retired (i.e., no longer used to store user data) or non-retired (i.e., active or still usable to store user data).

In various implementations, BSI 502 can be collected into a single data structure (e.g., a vector or table) within block 500 and/or maintained elsewhere in data storage system 120.

Because the flash translation layer implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity.

Figure 6A:
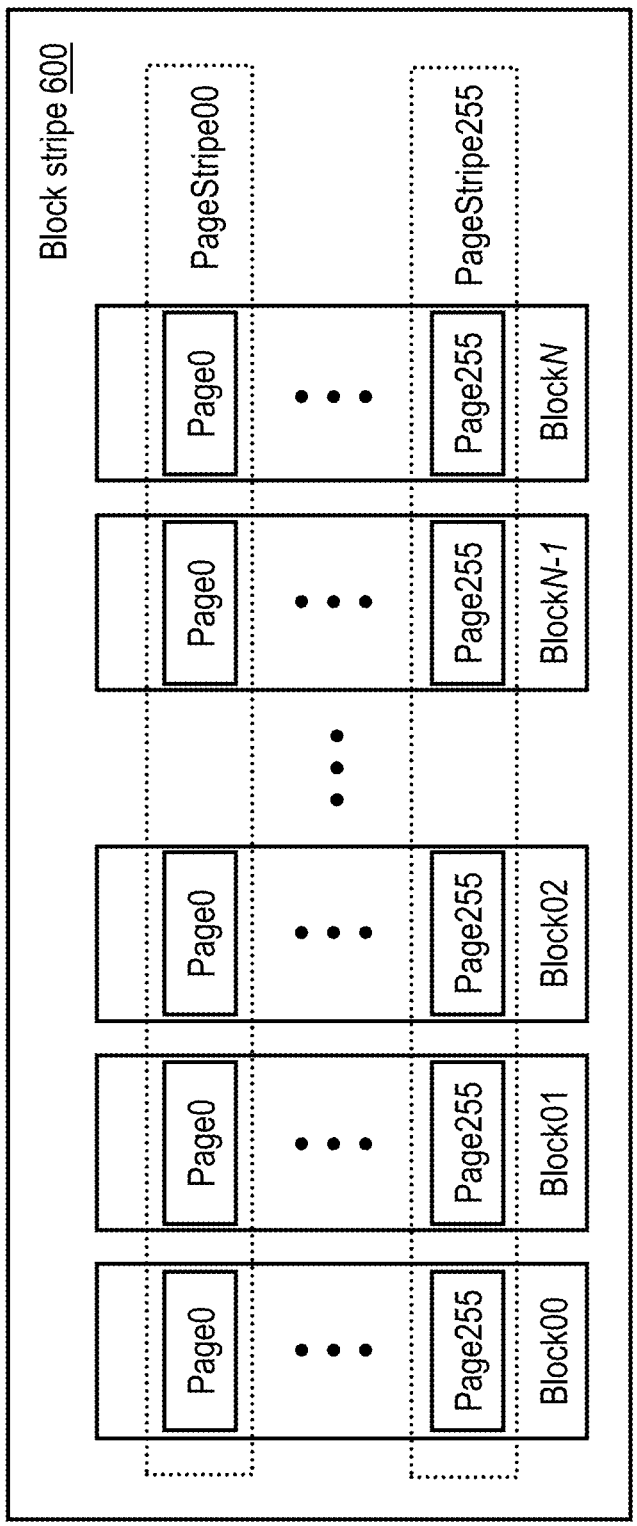
FIG. 6A depicts an exemplary implementation of a block stripe in accordance with the present disclosure.

In some embodiments, data is written to NAND flash memory system 150 one page at a time. In other embodiments in which more robust error recovery is desired, data is written to groups of associated physical pages of NAND flash memory system 150 referred to herein as "page stripes." In a preferred embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
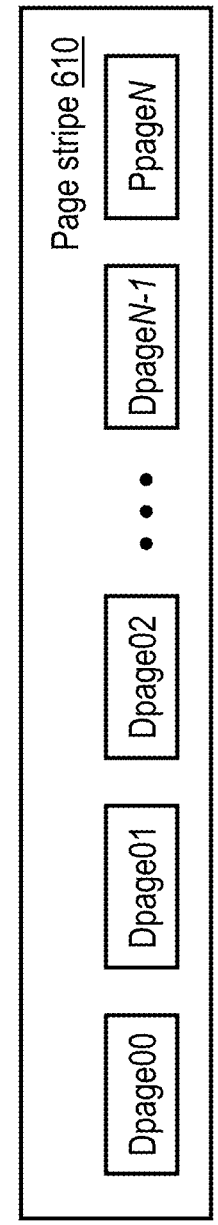
FIG. 6B depicts an exemplary implementation of a page stripe in accordance with the present disclosure.

Once a block from each lane has been selected and a block stripe is formed, page stripes are preferably formed from physical pages with the same page number (i.e., physical page index) from blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time.

After garbage collection of the block stripe completes, the block stripe can be dissolved, and each block can be placed into the relevant ready-to-use (RTU) queue as explained below.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706. In case data field 702 holds fractions of logical data pages, the LBA field 704 further holds information on which fractions of logical data pages are stored in the data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of the LBA fields 704 of the codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each codeword of a data page allows the correction of some number of bit errors within the codeword in a flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the one or more data protection pages for the page stripe. Failing the ability to reconstruct data at the data stripe level, data may be reconstructed by a higher level controller (e.g., control plane GPP 113 or RAID controller 124) as discussed further below.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of the RTU queues 906 corresponding to its channel.

A build block stripes function 920 performed by flash management code running on the GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics of each erased block, each erased block is either retired (i.e., no longer used to store user data) by a block retirement function 918 among the flash management functions executed on GPP 132, or alternatively, prepared for reuse by placing the block's identifier on the appropriate ready-to-use (RTU) queue 906 in the associated GPP memory 134.

Figure 9:
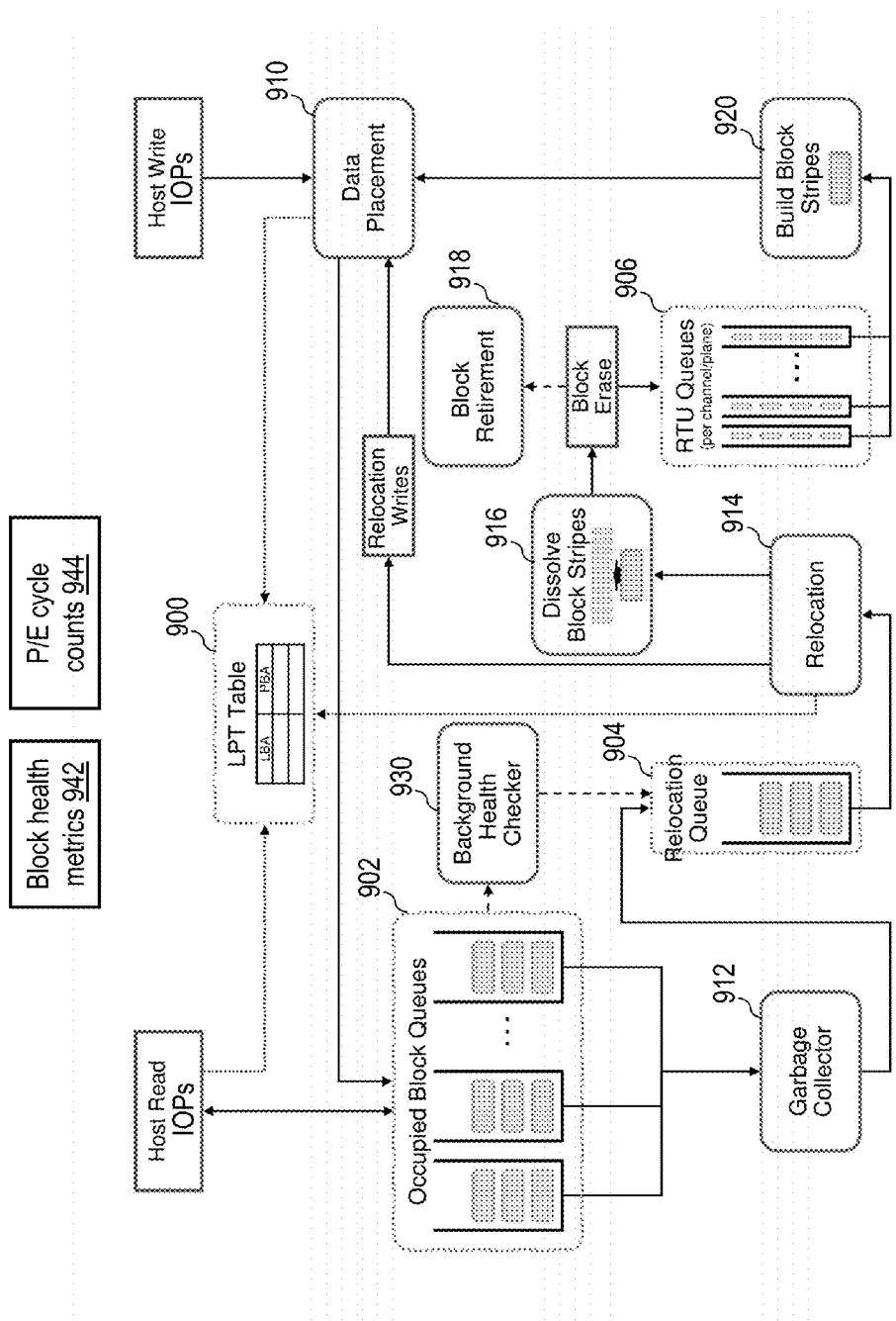
FIG. 9 is a high level flow diagram of the flash management functions and data structures employed to manage a flash memory in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 (e.g., worst page and/or mean page bit error rate (BER), programming and read voltages, etc.) for blocks belonging to block stripes recorded in occupied block queues 902. Based on the one or more of the block health metrics 942, background health checker 930 may place block stripes on relocation queue 904 for handling by relocation function 914.

In the embodiments described above, data storage system 120 implements multiple levels of error detection and correction to protect against different types of flash-related and system-level failures. In the described embodiments, the levels of error detection and correction include at least: (1) lower level data protection information (e.g., ECC information) stored within ECC fields 708, which facilitates the detection and correction of flash media errors within each codeword of a physical page, (2) mid-level data protection information (e.g., parity information) stored within data protection codewords 800, which protects against page, block, chip, channel, and plane failures, and (3) higher level data protection information (e.g., parity information) implemented by RAID controllers 124 on top of flash cards 126, which protects against flash card failures. In accordance with at least one embodiment, a failure to correct multi-page errors using the lower level and mid-level data protection information does not automatically result in faulting a flash card 126 (and the concomitant rebuild of the contents of the flash card 126); instead, an attempt is first made to reconstruct corrupted data in an affected page stripe from the higher level data protection information.

Figure 10:
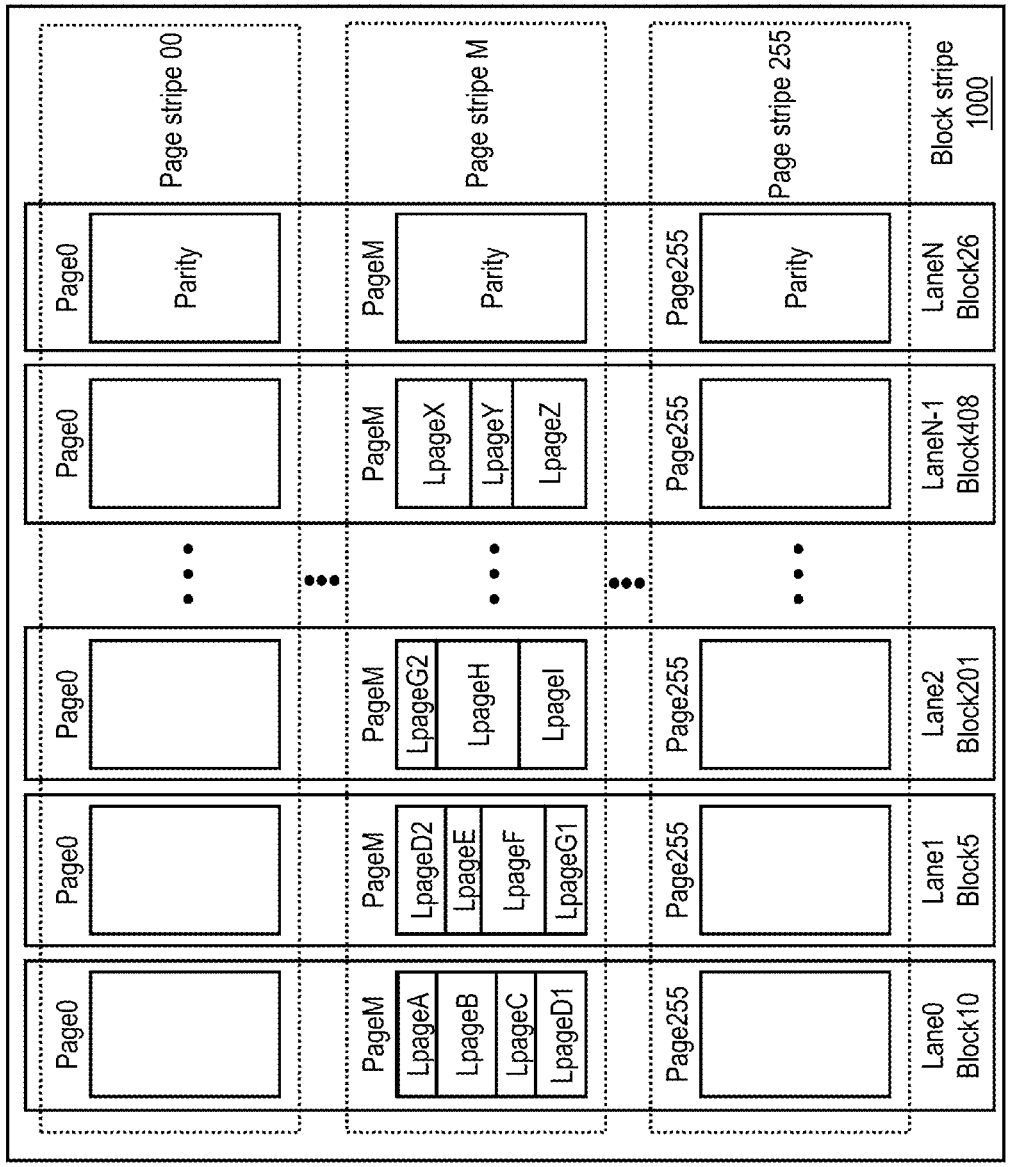
FIG. 10 depicts an exemplary block stripe in accordance with one embodiment.

Referring now to FIG. 10, there is depicted an exemplary block stripe 1000 in accordance with one embodiment. In this example, block stripe 1000 is formed of N+1 blocks taken from N+1 different lanes of a given NAND flash memory system 150. As indicated, the blocks selected for inclusion in the block stripe by build block stripes function 920 may have any associated block index (e.g., block10 from Lane 0, block5 from lane 1, block 201 from lane 2, etc.).

The physical pages comprising the blocks are in turn utilized to form 256 page stripes, for example, by forming each page stripe from all pages having a common page index (e.g., Page0, PageM, Page255, etc.). As noted above, each page stripe includes a data protection page used to store mid-level data protection information for the page stripe when a RAID-5 like parity scheme is used. Clearly, the number of data protection pages in a page stripe depends on the data protection scheme used and can include more than one data protection page per page stripe. In this example, page stripe M stores a number of logical pages denoted as LpageA, LpageB, LpageZ. Logical pages may or may not be aligned to physical pages. Typically, compressed logical pages will not be aligned to physical pages. In some cases, a logical page, such as LpageD, spans a physical page boundary. Consequently, in this example, a first portion of LpageD denoted as LpageD1 resides in physical page PageM of lane 0, and a second portion of LpageD denoted as LpageD2 resides in physical page PageM of lane 2. In other implementations, data pages may instead span to an adjacent physical page in the same lane.

With reference now to FIG. 11, there is illustrated an example of how LPT table 900 maps the logical block addresses (LBAs) of the logical pages stored within page stripe M of FIG. 10 to physical block addresses (PBAs) in accordance with one embodiment. In the illustrated embodiment, LPT table 900 includes a plurality of entries 1100 each of which includes an LBA field 1102 and a PBA field 1104. As indicated, the LBA field 1102 of each entry 1100 records the LBA of a particular logical page (e.g., LpageA, LpageB, etc.), and the associated PBA field 1104 records the corresponding PBA, which includes an indication of the lane number, block number, and offset within the block of the beginning of the logical page. In addition, the PBA field 1104 further includes an indication of the plane, die, and chip enable (not shown in FIG. 11). Thus, LPT table 900 provides complete information regarding the physical storage location of each logical page residing within any page stripe of the associated NAND flash memory system 150.

Figure 12:
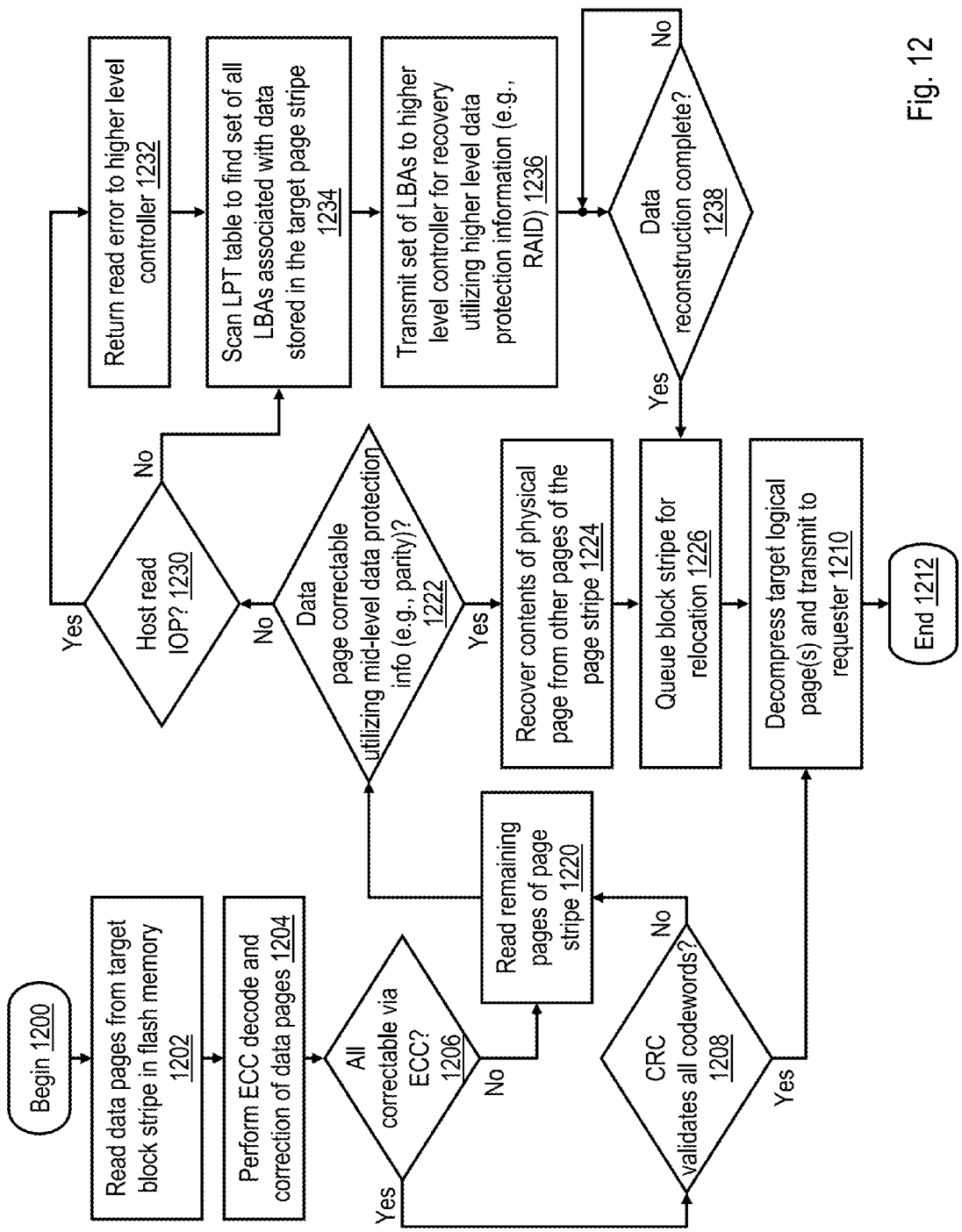
FIG. 12 depicts a high level logical flowchart of an exemplary process for recovering from multi-page errors in a data storage system.

Referring now to FIG. 12, there is depicted a high level logical flowchart of an exemplary process for recovering from multi-page errors in a data storage system, such as data storage system 120. The illustrated process can be performed by a flash controller 140 and/or GPP 132 (either or both of which may be referred to generally as a "controller"), for example, during a demand read operation performed in response to a host system's read IOP, during a background read performed by background health checker 930, or during a relocation read by relocation function 914 The method may be implemented, for example, in hardware and/or by hardware executing firmware and/or software. For ease of description, the process of FIG. 12 will hereafter be described as being performed by flash controller 140.

The illustrated process begins at block 1200 in response to flash controller 140 receiving a read IOP, background read request or relocation read request for servicing. In response to the read request received at block 1200, the process continues with block 1202, which illustrates flash controller 140 serving the read request by reading one or more pages from a target page stripe in the associated NAND flash memory system 150. Flash controller 140 issues one or more local read requests to read the physical pages storing the requested logical page(s). These local read request(s), which can be issued by flash controller 140 to the relevant lane or lanes in parallel or nearly in parallel, specify target PBA(s) that are obtained from LPT table 900 based on a LBA(s) specified by a read IOP or that are directly specified by background health checker 930 or relocation function 914.

At block 1204, flash controller 140 receives the physical page(s) containing the requested logical page(s). An ECC decoder 144 within flash controller 140 performs ECC decoding for all of the codewords within the physical pages accessed at block 1202 to attempt to correct any bit errors that are detected. In the depicted embodiment, if the bit errors, if any, in the codewords are correctable, the ECC decoder 144 corrects the bit errors and returns the number of such bit errors and a correctable status. For example, the ECC decoder 144 will determine that bit errors are correctable if there are 50 bits in error within the codeword and the ECC is capable of correcting greater than 50 bits in error within the codeword. If, on the other hand, the bit errors detected in a codeword are uncorrectable, the ECC decoder 144 returns an uncorrectable status for that codeword. It will be appreciated that bit errors in the codewords can be caused by a variety of factors including, but not limited to, the physical failure of one or more components within a given memory chip (such as the failure of a charge pump), the physical failure of an entire memory chip or the external support structures for that chip (e.g., the breaking of a power line or an address line to a chip), the physical failure of all or part of a chip as a result of environmental factors (e.g., excessive temperature, magnetic field, humidity, etc), trapped charge in the oxide layer of the physical device, leakage of charge from the floating gate (or similar charge trap device) of a memory cell, and/or electrical noise inflicted by writes or reads of adjacent memory cells.

At block 1206, flash controller 140 determines whether or not the ECC decoder 144 returned a correctable status for all of the codewords stored within the data page(s) that have been read. If not, the process passes to block 1220, which is described below. If, however, flash controller 140 determines at block 1206 that ECC decoder 144 returned a correctable status for all codewords stored within the data page(s) that were read, the process passes to block 1208. Block 1208 illustrates flash controller 140 determining whether or not all codewords stored within the data pages that were read are validated by their associated CRC fields 706. (In alternative embodiments in which CRC information is not maintained or in which secondary validation of the read data is not desired, block 1208 may be omitted.) In making the determination depicted at block 1208, flash controller 140 computes a cyclic redundancy code for each data codeword 700 within the data pages that were read and compares the computed CRC to that contained in the relevant CRC field 706. In response to a negative determination at block 1208, the process passes to block 1220, which is described below. If, however, flash controller 140 determines at block 1208 that each codeword within the read data is validated by its associated CRC field 706, flash controller 140 decompresses, if necessary, the target logical page(s) and transmits the decompressed logical page(s) to the requester (block 1210). Thereafter, the process ends at block 1212.

Returning to block 1206, in response to a determination that the ECC decoder 144 did not return a correctable status for all of the codewords within the read data (i.e., the ECC decoder returned an uncorrectable status for one or more codewords), the process proceeds from block 1206 to block 1220, which illustrates flash controller 140 reading all remaining physical pages of the page stripe. At block 1220, flash controller 140 also determines whether or not the ECC decoder 144 returned a correctable status for (and optionally whether the CRC information could be verified for) each of the remaining physical pages of the page stripe. Next, at block 1222, flash controller 140 determines whether the contents of the data page(s) that were uncorrectable by the lower level data protection information (e.g., ECC information) can be recovered utilizing mid-level data protection information. In a preferred embodiment in which flash controller 140 implements the mid-level data protection scheme utilizing RAID 5 or RAID 6, the determination illustrated at block 1222 includes flash controller 140 determining whether or not the uncorrectable codewords reside in more than one or two physical pages (since RAID 5 parity can recover the contents of at most one physical page and RAID 6 parity at most two physical pages). In response to a negative determination at block 1222 (e.g., meaning that uncorrectable codewords were present in two or more data pages for RAID 5 or three or more data pages for RAID 6), the process passes to block 1230 and following blocks, which as described below illustrate flash controller 140 triggering recovery of the target page stripe utilizing higher level data protection information. However, in response to a positive determination at block 1222, the process proceeds to block 1224.

Block 1224 depicts flash controller 140 recovering the contents of the physical page(s) containing the uncorrectable codeword(s) from the contents of the other physical pages of the page stripe. For example, in a preferred embodiment in which the mid-level data protection scheme utilizes RAID 5 or RAID 6, the contents of the physical page containing the uncorrectable codeword(s) can be recovered by performing a bitwise XOR of the contents of the other physical pages of the target page stripe. At block 1226, flash controller 140 also queues the block stripe containing the target page stripe for relocation by relocation function 914. (An alternative embodiment may only relocate the affected page stripe or not trigger any relocation at all.) The process then proceeds to blocks 1210 and 1212, which have been described.

Referring now to block 1230 and following blocks, flash controller 140 triggers an attempt to recover the contents of the target page stripe utilizing the higher level data protection information maintained by RAID controllers 124. At block 1230, flash controller 140 first determines whether or not the read request received at block 1200 was a host read IOP. If not, the process passes to block 1234. If so, flash controller 140 returns a read error to the RAID controller 124 from which the read IOP was received (block 1232). The read error will automatically trigger reconstruction of the requested logical page(s) by the RAID controller 124 utilizing the higher level data protection information.

It is important to note, however, that at this point in the process any additional failed logical page of the target page stripe that has not been read by the host will not be reconstructed. Unlike RAID arrays of conventional magnetic hard disk drives (HDDs), in which the reconstruction in the RAID controller results in adjacent pages within the same RAID stripe (and hence adjacent locations on the disks) being reconstructed, such automated reconstruction of adjacent storage locations is not applicable for flash-based storage devices such as flash cards 126 or SSDs. In RAID arrays with HDDs the reconstruction can be easily extended to other adjacent RAID stripes due to the known striping algorithm of the RAID array and the lack of an additional address indirection layer in HDDs, which allow neighboring disk sectors to be quickly identified, verified, and reconstructed (if needed). However, the necessity to write out of place and thereby maintain an LPT table in flash-based storage devices results in adjacent logical pages generally not being stored in adjacent physical pages. Hence, data pages in a page stripe do not necessarily store adjacent logical pages. As a consequence, the higher level RAID lacks necessary information about other logical pages potentially affected by a mid-level data protection recovery failure. In addition, in this situation the higher level RAID only gets notified by the flash card 126 of a read error in case the read operation had been requested by the host, but not in other cases (e.g., background read or relocation read operation). Following block 1232, the process passes to block 1234.

Block 1234 depicts flash controller 140 scanning LPT table 900 to find all LBAs associated with logical pages stored in the target page stripe. Thus, by locating entries 1100 having PBA fields 1104 that record lane, plane, die, chip enable, block and offsets corresponding to data pages of the target page stripe, flash controller 140 can obtain from the associated LBA fields 1102 the relevant set of LBAs. In another embodiment, some part of the LBA field may be stored with the PBA field, in order to accelerate the scanning of LPT table 900. In such embodiment, flash controller 140 would not have to scan the entirety of LPT table 900, but only the entries which match the part of the LBA field stored with the PBA field. At block 1236, flash controller 140 transmits a page stripe reconstruction request including or referencing the set of LBAs determined at block 1236 to a higher level controller to initiate recovery of the target page stripe. In some embodiments, the higher level controller can be one of RAID controllers 124; in other embodiments, the higher level controller can be implemented with another controller, such as control plane GPP 113 of FIG. 1B. In either case, the higher level controller utilizes the set of logical addresses and the higher level data protection information to reconstruct at least the target page stripe (if not the whole block stripe) at a new location within NAND flash memory system 150. The transmission of the page stripe reconstruction request may be initiated by the flash controller 124 if such a mechanism exists (e.g., an outstanding vendor-specific SCSI command or a separate communication channel or bus for control information) or initiated by the higher level controller using a SCSI log sense page request. By reconstructing only the page stripe (or block stripe) in which the read failure occurred (rather than an entire flash card 126), recovery performance is significantly improved.

The process proceeds from block 1236 to block 1238, which illustrates flash controller 140 determining whether or not reconstruction of the target page stripe by the higher level controller is complete. In one embodiment, the higher level controller communicates completion of reconstruction of the target data stripe to flash controller 140 by sending a special command indicating completion of the reconstruction of the target page stripe. In an alternative embodiment, flash controller 140 processes all write status notifications for its NAND flash memory system 150 to detect whether or not all LBAs within the set of LBAs passed to the higher level controller have been written to a new physical location. In response to flash controller 140 determining at block 1238 that the target block stripe has been successfully rebuilt by the higher level controller, the process passes to optional block 1226, which illustrates flash controller 140 queuing the entire block stripe containing the target data stripe in relocation queue 904 for subsequent relocation. In case all valid logical pages of the block stripe have already been reconstructed and relocated by the higher level controller, the block stripe can instead simply be dissolved by dissolve block stripes function 916 as it no longer holds valid data. It should be noted that the relocation depicted at block 1226 may trigger another read failure for a block stripe, which will cause the process of FIG. 12 to again be performed. Following block 1226, the process passes to block 1210 and 1212, which have been described.

In at least some embodiments, further refinements of the process of FIG. 12 can be implemented. For example, if flash controller 140 determines at block 1222 that the target page stripe includes multiple physical pages containing uncorrectable codewords and one of these physical pages is the parity page (e.g., if RAID 5 is employed) or one of the multiple parity pages (e.g., if RAID 6 is employed) of the mid-level data protection scheme, then the parity page cannot be reconstructed by the higher level controller as it has no LBA associated with it. Hence, only the LBAs on the failing data pages need be sent to the higher level controller for reconstruction.

In addition, the exemplary embodiment shown in FIG. 12 waits until a physical page has one or more codewords containing uncorrectable errors before initiating recovery of one or more physical pages. However, certain implementations may choose to initiate such recovery at some point prior to uncorrectability. For example, in one embodiment, flash controller 140 further determines at block 1206 whether the number of corrected bit errors satisfies (e.g., is great than or equal to) a bit error threshold lower than the ECC correction threshold. For example, if an implementation uses BCH ECC over approximately 1024 bytes and can correct 50 bits in error, flash controller 140 may decide to retire a page when the number of corrected bit errors reaches a number less than 50, say 48. In such implementations, the process passes from block 1206 to block 1208 in response to a determination that the bit error threshold is exceeded.

Additionally, one skilled in the art will also know that, depending on the flash technology used, that flash controller 140 may elect to perform additional steps at block 1206 and block 1220 before determining that a codeword is truly uncorrectable and recovery should be invoked. For example, the flash manufacturer may require flash controller 140 to change certain parameters for that page or block and perform a re-read of the data page. If the bit errors, if any, detected upon the re-read are correctable, then flash controller 140 would follow the "Yes" path from block 1206 to block 1208. In this way, block 1206 may contain many additional steps that, although not illustrated in detail, are performed in determining that a codeword contains a truly uncorrectable error.

Further, in some embodiments it may be preferable to reduce latency of the rebuild process for a failed host read IOP to return a read error to the higher level controller as indicated in blocks 1230 and 1232 before flash controller 140 reads all remaining physical pages of the target page stripe. Doing so reduces the additional latency of the host read IOP due to the rebuild process to only the latency of the higher level controller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a non-volatile memory array including a plurality of blocks each including a plurality of physical pages is controlled by a controller. The controller implements a plurality of nested page retirement classes each defined by a respective one of a plurality of different nested subsets of page indices of physical pages within the plurality of blocks that are to be considered retired from use. For each block among the plurality of blocks, the controller updating an indication of a page retirement class to which the block belongs in response to detection of a retirement-causing error in a data page stored in a physical page of the block. The controller forms block stripes for storing data from the plurality of blocks based on the page retirement classes of the blocks.

In at least one embodiment, a data storage system includes a controller and a non-volatile memory array having a plurality of blocks each including a plurality of physical pages. The controller maintains a logical-to-physical translation (LPT) data structure that maps logical addresses to physical addresses and implements a first data protection scheme that stripes write data over the plurality of physical blocks. In response to a read request requesting data from a target page stripe, the controller detecting errors in multiple physical pages of the target page stripe. In responsive to detecting errors in multiple physical pages of the target page stripe, the controller scans the LPT data structure to identify a set of logical addresses mapped to the target page stripe and initiates recovery of the target page stripe by a higher level controller that implements a second data protection scheme, wherein initiating recovery includes transmitting the set of logical addresses to the higher level controller.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude energy per se, transmission media per se, and transitory propagating signals per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a non-volatile memory array controlled by a controller, wherein the non-volatile memory array includes a plurality of blocks each including a plurality of physical pages, the method comprising:

the controller maintaining a logical-to-physical translation (LPT) data structure that maps logical addresses to physical addresses in the non-volatile memory array;

the controller implementing a first data protection scheme that stripes write data over the plurality of physical blocks to form a plurality of page stripes;

in response to a read request requesting data from a target page stripe among the plurality of page stripes, the controller detecting errors in data read from multiple physical pages storing data of the target page stripe, wherein the errors are not correctable by the controller utilizing the first data protection scheme; and in response to detecting errors that are not correctable by the controller utilizing the first data protection scheme in data read from multiple physical pages of the target page stripe, the controller scanning the LPT data structure to identify a set of logical addresses mapped to the target page stripe and triggering recovery of the target page stripe by a higher level controller that implements a second data protection scheme, wherein triggering recovery includes the controller transmitting the set of logical addresses to the higher level controller.

2. The method of claim 1, and further comprising:
the controller determining whether the higher level controller has completed reconstruction of the target page stripe; and
in response to determining that the higher level controller has completed reconstruction of the target page stripe, the controller relocating contents of a block stripe that included the target page stripe and multiple other page stripes within the non-volatile memory array.

3. The method of claim 1, wherein:
the controller controls a first memory device;
the first data protection scheme comprises a parity-based data protection scheme; and
the second data protection scheme comprises a redundant array of independent disks (RAID) data protection scheme over a plurality of memory devices including the first memory device.

4. The method of claim 1, and further comprising:
the controller detecting errors in data read from the multiple physical pages of the target page stripe utilizing a third data protection scheme that employs error correcting codes (ECC).

5. The method of claim 1, and further comprising the controller transmitting a read error to the higher level controller in response to the read request being a host read request.

6. The method of claim 1, wherein:
the set of logical addresses are mapped to only a subset of the pages of the target page stripe.

7. The method of claim 1, and further comprising:
in response to detecting one or more errors in a single data page of the target page stripe, the controller recovering contents of the target page utilizing the first data protection scheme.

8. The method of claim 1, wherein the controller performs the transmitting of the set of logical addresses to the higher level controller in response to receipt of a request from the higher level controller.

9. A data storage system, comprising:
a controller configured to be coupled to a non-volatile memory array including a plurality of blocks each including multiple physical pages and to a memory that includes a logical-to-physical translation (LPT) data structure that maps logical addresses to physical addresses in the non-volatile memory array, wherein the controller is configured to implement a first data protection scheme that stripes write data over the plurality of physical blocks to form a plurality of page stripes, wherein the controller is configured, responsive to a read request requesting data from a target page stripe among the plurality of page stripes, to detect errors in data read from multiple physical pages storing data of the target page stripe and, responsive to detecting errors that are not correctable by the controller utilizing the first data protection scheme in data read from multiple physical pages of the target page stripe, to scan the LPT data structure to identify a set of logical addresses mapped to the target page stripe and to trigger recovery of the target page stripe by a higher level controller that implements a second data protection scheme, wherein the controller transmits the set of logical addresses to the higher level controller.

10. The data storage system of claim 9, wherein the controller is further configured to determine whether the higher level controller has completed reconstruction of the target page stripe and, responsive to determining that the higher level controller has completed reconstruction of the target page stripe, to relocate contents of a block stripe that included the target page stripe and multiple other page stripes within the non-volatile memory array.

11. The data storage system of claim 9, wherein:
the controller controls a first memory device;
the first data protection scheme comprises a parity-based data protection scheme; and
the second data protection scheme comprises a redundant array of independent disks (RAID) data protection scheme over a plurality of memory devices including the first memory device.

12. The data storage system of claim 9, wherein the controller is further configured to detect errors in data read from multiple physical pages of the target page stripe utilizing a third data protection scheme that employs error correcting codes (ECC).

13. The data storage system of claim 9, wherein the controller is configured to transmit a read error to the higher level controller in response to the read request being a host read request.

14. The data storage system of claim 9, wherein:
the set of logical addresses are mapped to only a subset of the pages of the target page stripe.

15. The data storage system of claim 9, wherein the controller is configured, responsive to detecting one or more errors in a single data page of the target page stripe, to recover contents of the target page utilizing the first data protection scheme.

16. The data storage system of claim 9, wherein the controller is configured to transmit the set of logical addresses to the higher level controller in response to receipt of a request from the higher level controller.

17. The data storage system of claim 9, and further comprising the non-volatile memory array coupled to the controller.

18. A computer program product, the computer program product comprising a computer readable storage device having program instructions embodied therewith, the program instructions executable by a controller for a non-volatile memory array including a plurality of blocks each including a plurality of physical pages, to cause the controller to perform:
the controller maintaining a logical-to-physical translation (LPT) data structure that maps logical addresses to physical addresses in the non-volatile memory array;
the controller implementing a first data protection scheme that stripes write data over the plurality of physical blocks to form a plurality of page stripes;
in response to a read request requesting data from a target page stripe among the plurality of page stripes, the controller detecting errors in data read from multiple physical pages storing data of the target page stripe, wherein the errors are not correctable by the controller utilizing the first data protection scheme; and
in response to detecting errors that are not correctable by the controller utilizing the first data protection scheme in data read from multiple physical pages of the target page stripe, the controller scanning the LPT data structure to identify a set of logical addresses mapped to the target page stripe and triggering recovery of the target page stripe by a higher level controller that implements a second data protection scheme, wherein triggering recovery includes the controller transmitting the set of logical addresses to the higher level controller.

19. The program product of claim 18, wherein the program instructions further cause the controller to perform:
   determining whether the higher level controller has completed reconstruction of the target page stripe; and
   in response to determining that the higher level controller has completed reconstruction of the target page stripe, relocating contents of a block stripe that included the target page stripe and multiple other page stripes within the non-volatile memory array.

20. The program product of claim 18, wherein:
   the controller controls a first memory device;
   the first data protection scheme comprises a parity-based data protection scheme; and
   the second data protection scheme comprises a redundant array of independent disks (RAID) data protection scheme over a plurality of memory devices including the first memory device.

21. The program product of claim 18, wherein the program instructions further cause the controller to perform:
   the controller detecting errors in data read from multiple physical pages of the target page stripe utilizing a third data protection scheme that employs error correcting codes (ECC).

22. The program product of claim 18, wherein the program instructions further cause the controller to perform:
   transmitting a read error to the higher level controller in response to the read request being a host read request.

23. The program product of claim 18, wherein:
   the set of logical addresses are mapped to only a subset of the pages of the target page stripe.

24. The program product of claim 18, wherein the program instructions further cause the controller to perform:
   in response to detecting one or more errors in a single data page of the target page stripe, the controller recovering contents of the target page utilizing the first data protection scheme.

25. The program product of claim 18, wherein the program instructions further cause the controller to perform the transmitting of the set of logical addresses to the higher level controller in response to receipt of a request from the higher level controller.

* * * * *